US008627303B2

(12) United States Patent
Adams, III et al.

(10) Patent No.: US 8,627,303 B2
(45) Date of Patent: Jan. 7, 2014

(54) MEMORY OPTIMIZATION OF VIRTUAL MACHINE CODE BY PARTITIONING EXTRANEOUS INFORMATION

(75) Inventors: Henry Walton Adams, III, Durham, NC (US); Sean Christopher Foley, Ottawa (CA); Curtis E. Hrischuk, Durham, NC (US); Andrew Russell Low, Ottawa (CA); Peter Duncan Shipton, Ottawa (CA)

(73) Assignee: International Business Machines Corporation, Armonk, NY (US)

(*) Notice: Subject to any disclaimer, the term of this patent is extended or adjusted under 35 U.S.C. 154(b) by 784 days.

(21) Appl. No.: 12/627,206

(22) Filed: Nov. 30, 2009

(65) Prior Publication Data

US 2011/0131561 A1    Jun. 2, 2011

(51) Int. Cl.
G06F 9/45 (2006.01)
(52) U.S. Cl.
USPC .......................................................... 717/159
(58) Field of Classification Search
USPC .................. 717/126–133, 145–148, 159–161
See application file for complete search history.

(56) References Cited

U.S. PATENT DOCUMENTS

| 7,475,214 | B2 | 1/2009 | Hwang |
| 2004/0243989 | A1 | 12/2004 | Owens et al. |
| 2008/0028179 | A1 | 1/2008 | Mannarswamy et al. |
| 2009/0055821 | A1 | 2/2009 | Grcevski et al. |
| 2009/0172648 | A1* | 7/2009 | Gerginov et al. ............. 717/141 |

FOREIGN PATENT DOCUMENTS

| CN | 1499363 A | 5/2004 |
| CN | 1531680 A | 9/2004 |
| CN | 101042671 A | 9/2007 |
| CN | 101162439 A | 4/2008 |
| EP | 1387265 A1 | 2/2004 |
| EP | 1491999 A2 | 12/2004 |

OTHER PUBLICATIONS

Shiel et al., "A Translation-Facilitated Comparison Between the Common Language Runtime and the Java Virtual Machine", 2005, Electronic Notes in Theoretical Computer Science, pp. 35-52.*
Lenovo, "Hypervisor Service to Create Process in Another Virtual Machine," ip.com/ibm TDB: Sep. 26, 2006.
Goguen et al., "Virtual Machine Debugging Module," ip.com/ibm TDB; Jul. 29, 2009.
Auerbach et al., "Low Latency Time-Portable Real-Time Programming with Exotasks," ACM Digital Library; vol. 8, No. 2, Article 15, Jan. 2009.
Gummaraju et al., "Streamware: Programming General Purpose Multicore Processors Using Streams," ACM Digital Library; pp. 297-310, Mar. 2008.
Bhadra et al., "An Experimental Study of Methods for Executing Test Suites in Memory Constrained Environments," AST '09 May 18-19, 2009, Vancouver, Canada, pp. 27-35.
Chinese Office Action dated Mar. 22, 2013, 5 pages.

* cited by examiner

Primary Examiner — Ted T Vo
(74) Attorney, Agent, or Firm — Prentiss Johnson; SVL IP Law Edell, Shapiro & Finnan, LLC (57) ABSTRACT

A method, computer program product, and system for memory optimization by partitioning extraneous information from executable virtual machine code or interpreted code. The extraneous information may be stored separately, or accessed from the original code if needed for debugging or servicing the code in the field. This approach optimizes memory usage by reducing memory footprint while maintaining accessibility of the non-executable information for debugging and other processes necessary for servicing code in the field.

25 Claims, 7 Drawing Sheets

MEMORY OPTIMIZATION OF VIRTUAL MACHINE CODE BY PARTITIONING EXTRANEOUS INFORMATION

BACKGROUND

1. Technical Field

The present invention relates generally to virtual machine code, and more particularly to memory optimization of virtual machine code by partitioning extraneous information from executable code.

2. Discussion of Related Art

The advantages of virtual machine technology have become widely recognized. Among these advantages is the ability to run multiple virtual machines on a single host platform, which makes better use of the capacity of the hardware while ensuring that each user enjoys the features of a "complete" computer. With the growing complexity of computer software and the growing reliance on software systems in everyday life and business, high performance in software execution has become expected by users. Performance of virtual machine software is particularly important because this software is often run on systems that are memory constrained, for example on wireless devices such as PDAs and smartphones that tend to have less memory than a traditional computer system. Thus, efforts to reduce memory usage by virtual machine code during runtime have been made, such as minimizing native function calls, restricting the type of functionality offered in the native code, reducing application size, and requiring efficient coding. The reduction of memory usage remains a key goal for optimal software performance.

BRIEF SUMMARY

Accordingly, embodiments of the present invention include a method, computer program product and a system for optimizing virtual machine or interpreted code comprising receiving code comprising a plurality of program instructions and first extraneous information, where the code is written in a language for execution by a virtual machine and where the first extraneous information is a first type of non-executable information, modifying the code by removing the first extraneous information and replacing it with a key that references a location of the first extraneous information, and executing the modified code and, if an event requesting the first extraneous information occurs during execution, using the key to locate the first extraneous information in the location in response to the event, and loading the first extraneous information from the location.

The above and still further features and advantages of embodiments of the present invention will become apparent upon consideration of the following detailed description thereof, particularly when taken in conjunction with the accompanying drawings wherein like reference numerals in the various figures are utilized to designate like components.

DETAILED DESCRIPTION

Figure 1:
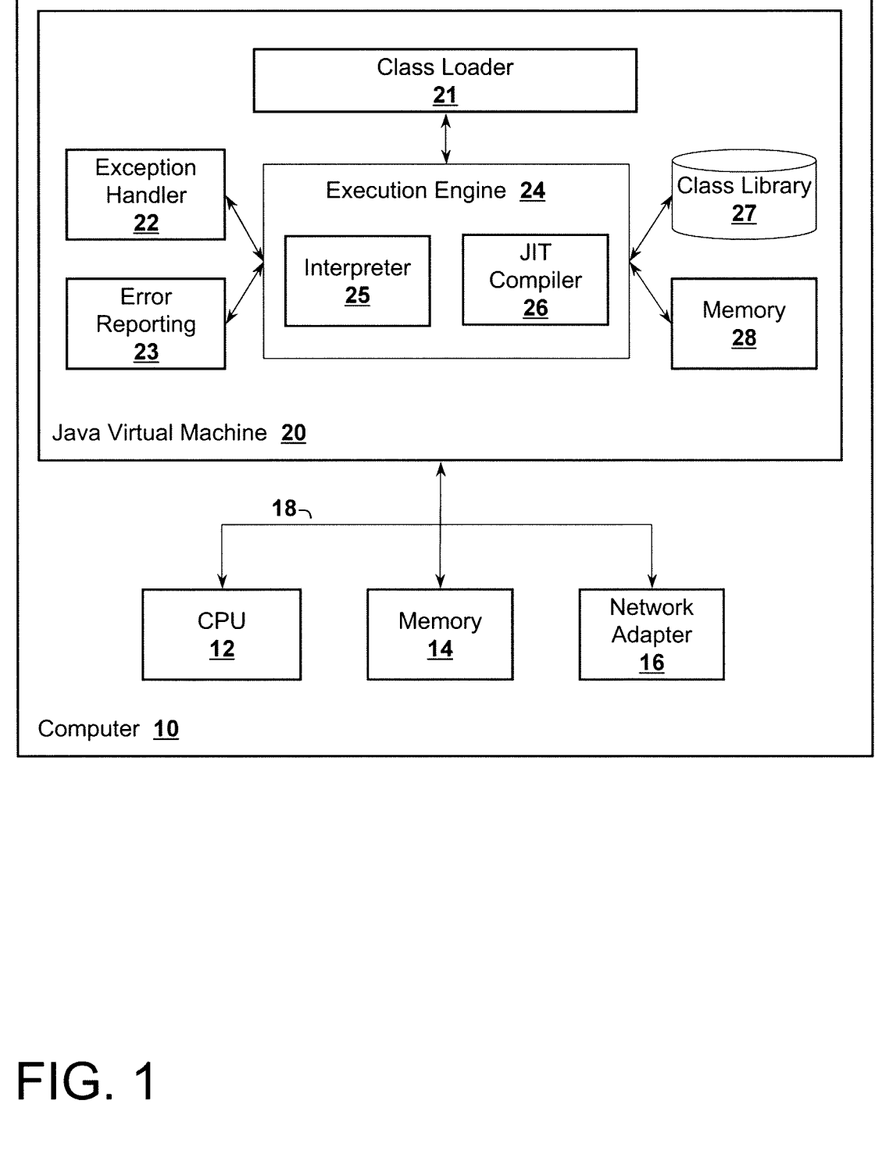
FIG. 1 is a block diagram illustrating an exemplary computer system comprising a virtual machine according to an embodiment of the present invention.

Referring now to the Figures, an exemplary computer system according to embodiments of the present invention is illustrated in FIG. 1. FIG. 1 shows a computer system 10 comprising processor 12, memory 14, network adapter 16, and a Java virtual machine 20, all communicatively coupled together by system bus 18. Memory 14 may be implemented by any conventional or other memory or storage device (e.g., RAM, cache, flash, etc.), and may include any suitable storage capacity. The network adapter 16 may be implemented so that the computer system 10 can communicate with one or more other systems by any quantity of any suitable communications media (e.g., WAN, LAN, Internet, Intranet, wired, wireless, etc.), through a shared memory, or in any other suitable fashion. The computer systems of the present embodiments may include any conventional or other communications devices to communicate over networks or other communications channels via any conventional or other protocols, and may utilize any type of connection (e.g., wired, wireless, etc.) for access.

The Java virtual machine 20 comprises various components such as class loader 21, exception handler module 22, error reporting module 23, execution engine 24, which comprises interpreter 25 and Just-in-Time compiler 26, class library 27 and memory 28. It should be understood that although the virtual machine 20 is discussed herein as a Java virtual machine, the present invention is not limited to Java technology, and may be implemented in conjunction with other technology and virtual machines such as a CPython virtual machine, .NET and Common Language Runtime, a Parrot virtual machine, a Rubinius virtual machine, or any other suitable virtual machine.

The class loader 21 loads code, for example a bytecode file such as a Java class (.class) or Java Archive (.jar) file, or a CIL bytecode file. The code comprises program instructions that have been compiled from any language suitable for use with a virtual machine, for example languages suitable for use with a CPython virtual machine include Python, languages suitable for use with a Java Virtual Machine (JVM) include Java, Clojure, Fan, Groovy, IBM NetRexx, JavaFX Script, JavaScript, JRuby, Jython, JScheme, Macromedia ColdFusion, Rhino, Scala, etc., languages suitable for use with a .NET Common Language Runtime (CLR) include C#, C++/CLI, Cobra, F#, Fan, IronPython, IronRuby, J#, JScript.NET, Managed JScript, Mondrian, Nemerle, VB.NET, etc., languages suitable for use with a Parrot virtual machine include Perl 6, and languages suitable for use with a Rubinius virtual machine include Ruby. The language may be an interpreted language or a compiled language, for example a language for use with a JVM may be JavaScript, which is generally interpreted, or Groovy, which is generally compiled.

The computer system 10 may be implemented in the form of a processing system, or may be in the form of software. The computer system 10 may be implemented by any quantity of conventional or other computer systems or devices (e.g., computer terminals, personal computers (e.g., IBM-compatible, Apple MacIntosh, tablet, laptop, etc.), etc.), cellular telephones, personal data assistants (e.g., Palm Pre, Treo, iPhone, etc.), etc., and may include any commercially available operating system (e.g., AIX, Linux, OSX, Sun Solaris, Unix, Windows, etc.) and any commercially available or custom software (e.g., browser software, communications software, word processing software, etc.). These systems may include types of displays and input devices (e.g., keyboard, mouse, voice recognition, etc.) to enter and/or view information. If embodied in software (e.g., as a virtual image), the computer system 10 may be available on a recordable medium (e.g., magnetic, optical, floppy, DVD, CD, etc.) or in the form of a carrier wave or signal for downloading from a source via a communication medium (e.g., bulletin board, network, LAN, WAN, Intranet, Internet, etc.).

Figure 2:
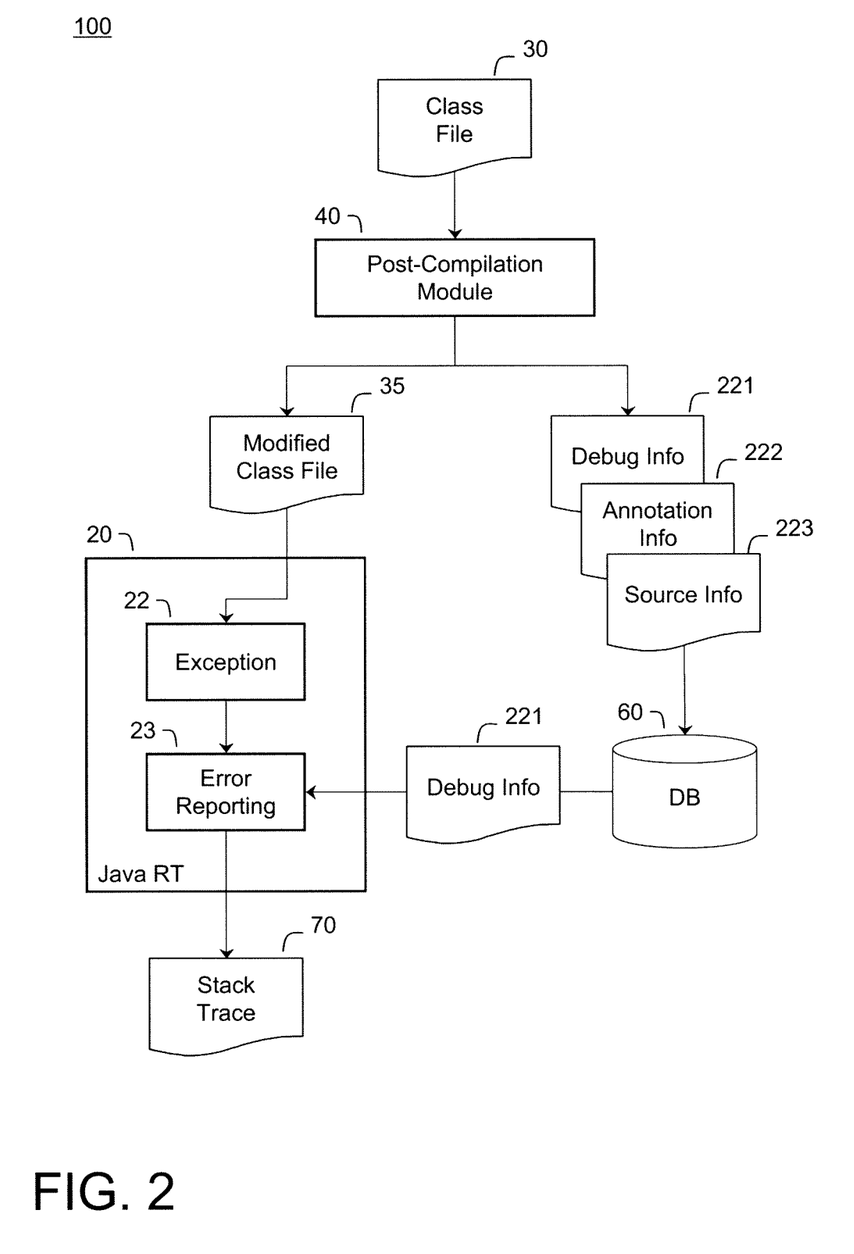
FIG. 2 is a block diagram illustrating an exemplary partitioning and memory optimization process according to a first embodiment of the present invention.
Figure 3:
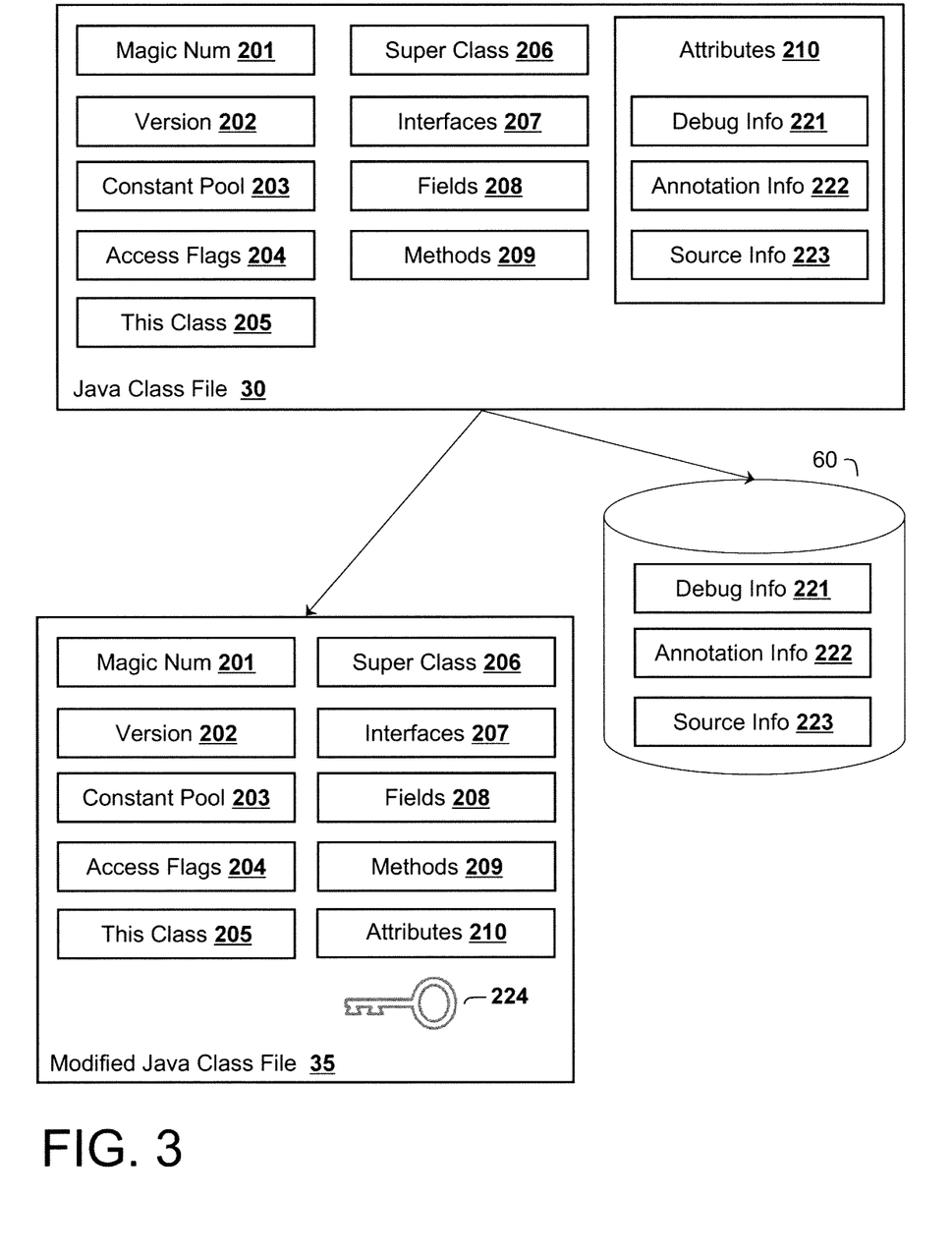
FIG. 3 is a block diagram illustrating the effects of the partitioning process of FIG. 2 on an exemplary Java class file according to a first embodiment of the present invention.
Figure 4A:
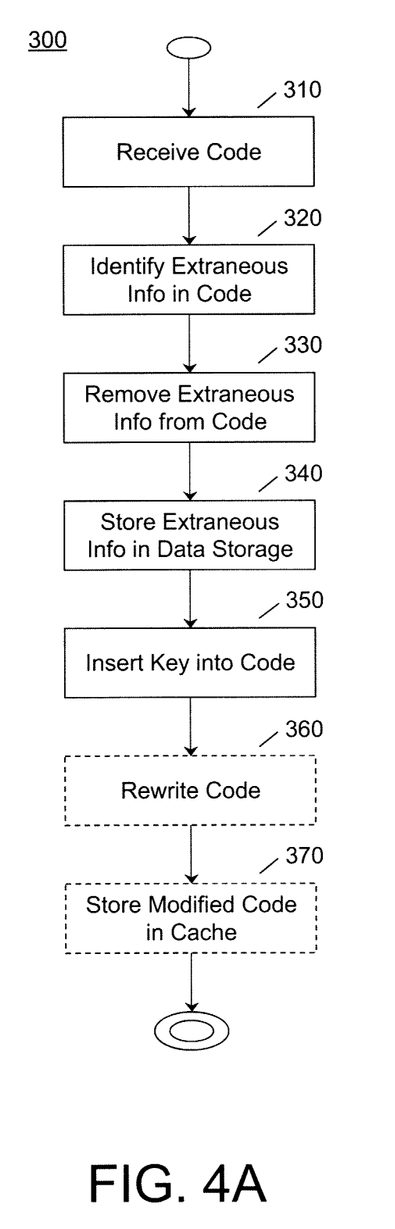
FIGS. 4A and B are flowcharts depicting a partitioning and memory optimization process according to a first embodiment of the present invention.
Figure 4B:
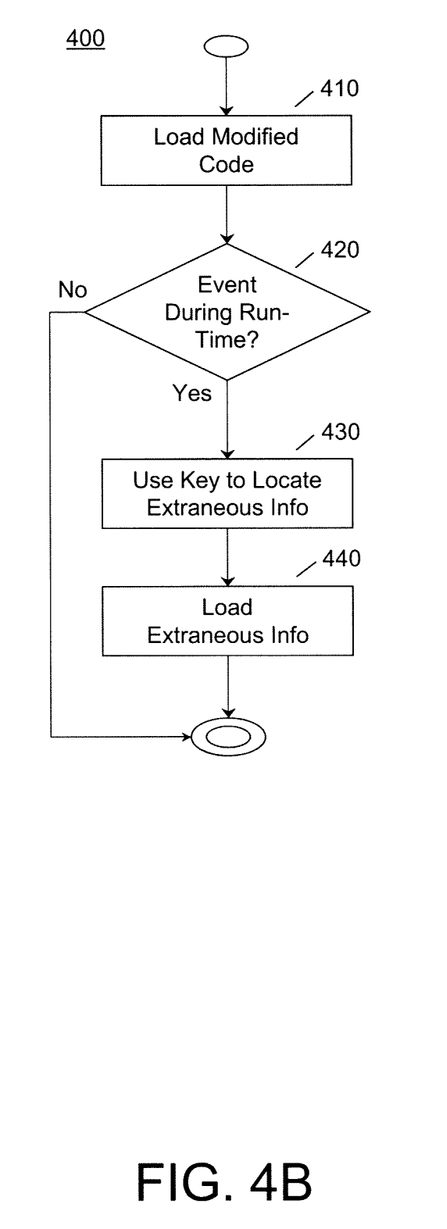

FIGS. 2 through 4 depict various aspects of a first embodiment of the present invention. In this embodiment, code is partitioned by separating extraneous information from the executable code, and storing the extraneous information separately so that the executable code may be loaded as normal, and the extraneous information may be lazy-loaded only when needed. This approach optimizes memory usage by reducing the memory footprint while maintaining accessibility of the extraneous information for debugging and other processes necessary for servicing code in the field.

FIG. 2 illustrates an exemplary partitioning and memory optimization process that may be performed by the system of FIG. 1 according to a first embodiment of the present invention. In this process, code 30 such as a Java class file or CIL code file is received by a post-compilation module 40, where extraneous information in the code 30 is identified. The extraneous information is non-executable information, for example debug information 221, annotation information 222, or source information 223. The code 30 is modified by removing the extraneous information to yield modified code 35, and storing the extraneous information in a data storage location such as database 60, a shared class cache, or as a nested inner-class or as a separate, binary object. A unique identification key that identifies the storage location is inserted into the modified code 35.

At run-time, the modified code 35 is loaded as normal into the virtual machine 20. If there is a need for the extraneous information during run-time, then the system may locate and load only the appropriate type of extraneous information needed for the particular task. For example, if a fault occurs, the exception handling process 22 and error reporting mechanism 23 request the debug information 221 in order to throw an exception and report the error, but have no need for the annotation information 222 and the source information 223. Similarly, if the code uses reflection, a reflection process may request the source information 223, but not the debug information 221. In the illustrated example, the error reporting mechanism 23 is a Java stack trace reporting method that requests four pieces of information to produce a stack trace 70: the class, method, file and line number. Normally, this information is populated by the virtual machine when an exception is constructed, but in these embodiments the file and line number were removed as part of the debug information 221, which was stored in the database 60. Accordingly, the exception handling process 22 and error reporting mechanism 23 use the key to find the storage location 60 in which the debug information 221 is stored, and then load the debug information 221 so that the stack trace 70 can be populated.

Referring now to FIG. 3, an exemplary Java class file 30 is shown, having ten primary components: magic number 201, version 202, constant pool 203, access flags 204, this class 205, super class 206, interfaces 207, fields 208, methods 209 and attributes 210. The attributes may include debug information 221, annotation information 222 and source information 223. The exemplary Java class file 30 is modified by having its extraneous information, in this case debug information 221, annotation information 222 and source information 223, partitioned from the program instructions and stored in storage location 60. The extraneous information is replaced by a key 224 in the modified Java class file 35, which key identifies the storage location where the extraneous information is stored.

In the context of Java technology, the debug information 221 may include attributes such as the following:
  SourceFile: (per class) the source file name with no path
    e.g., ClassName.java;
  SourceDebugExtension: typically unused;
  LineNumberTable: (per method) line numbers for the debugger to step through and for exception stack traces to print line numbers (maps bytecode index to line number in the source file);
  LocalVariableTable: (per method) names of local variables for the debugger while stepping; and
  LocalVariableTypeTable: (per method) in the cases of generic types (and only generics) the type of a local variable in the source file is different from the type in the VM. For example, the virtual machine will see Hashtable while the source file type may be generic Hashtable<Integer, String>.

This information is unnecessary for normal execution of the program instructions in the code, because it is typically used only for debugging and stack traces, and nothing else in a running program.

In the context of Java technology, the annotation information 222 may include attributes such as the following:
  AnnotationDefault;
  RuntimeVisibleAnnotations;
  RuntimeInvisibleAnnotations;
  RuntimeVisibleParameterAnnotations; and
  RuntimeInvisibleParameterAnnotations.

Also in the context of Java technology, the source information 223 may include attributes such as the following:
  EnclosingMethod: identifies the enclosing method of local classes;
  Signature: Identifies generic signatures for classes, field types and method signatures;
  Deprecated: Identifies deprecated items;
  Synthetic: Identifies a compiler-generated item; and
  InnerClasses: Identifies inner and outer class relationships (including nested and anonymous).

This information is unnecessary for normal execution of the program instructions in the code, because a running virtual machine does not need this information. This information is typically used only for reflection. Accordingly, while a program that makes extensive use of reflection might be affected by removal of this information, in general most programs will be unaffected by removal.

Turning now to FIGS. 4A and 4B, processes 300 and 400 for a partitioning and memory optimization process of a first embodiment are shown generally. Process 300 may be carried out at a time other than run-time (for example when a class is loaded), and process 400 is generally performed at run-time.

In process 300, the system, for example the system of FIG. 1, receives code in step 310, for example by being parsed by a post-processor, and in step 320 identifies extraneous information in the code. In step 330 the system removes the extraneous information from the code, and in step 340 stores the removed extraneous information in a data storage location. In step 350 the system inserts a key into the code to reference the location of the extraneous information. In a system such as an IBM J9 system, this process may be performed by a tool such as the Java Optimizer (JAPT) class manipulation tool.

In optional step 360, the system rewrites the code so that it indirectly, instead of directly, accesses the extraneous information, for example by modifying one or more of the plurality of program instructions to intercept an exception handling process and redirect it to the storage location using the key. This step is optional, because the process may be performed in other ways, for example by modifying the class library to alter the operation of native functions to transparently load the stored extraneous information, such as Throwable.getStackTrace( ), Class.getDeclaredAnnotations( ) and Class.getGenericInterfaces( ). For example, in the case of a stack trace, the class library may be modified to store the program counter in the StackTraceElement. The program counter is the index into the bytecode instructions at which the method call represented by the StackTraceElement occurs, and is used to find the line number in the line number debug info structure. In optional step 370, the modified code may be stored in cache memory such as the shared class cache, so that subsequent loads of the class may be from the shared class cache to reduce any load time penalty.

As shown in FIG. 4B, during run-time, the system loads the modified code in step 410, and then in step 420 determines if an event requiring extraneous information occurs, for example a fault or a reflection process. If not, this process 400 ends. If yes, the system in step 430 uses the key to locate the desired extraneous information in the storage location, and loads it in step 440. The memory optimization process then ends, and the system may perform any desired actions with the retrieved extraneous information. The located and loaded extraneous information may be one or more types of extraneous information, for example the debug information, annotation information, and source information previously described. The system may load only the extraneous information desired for a particular purpose, for example, if the system is creating a stack trace, it may locate and load only debug information needed to populate the stack trace, or, if the system uses reflection, it may locate and load only source information needed to perform reflection.

Figure 5:
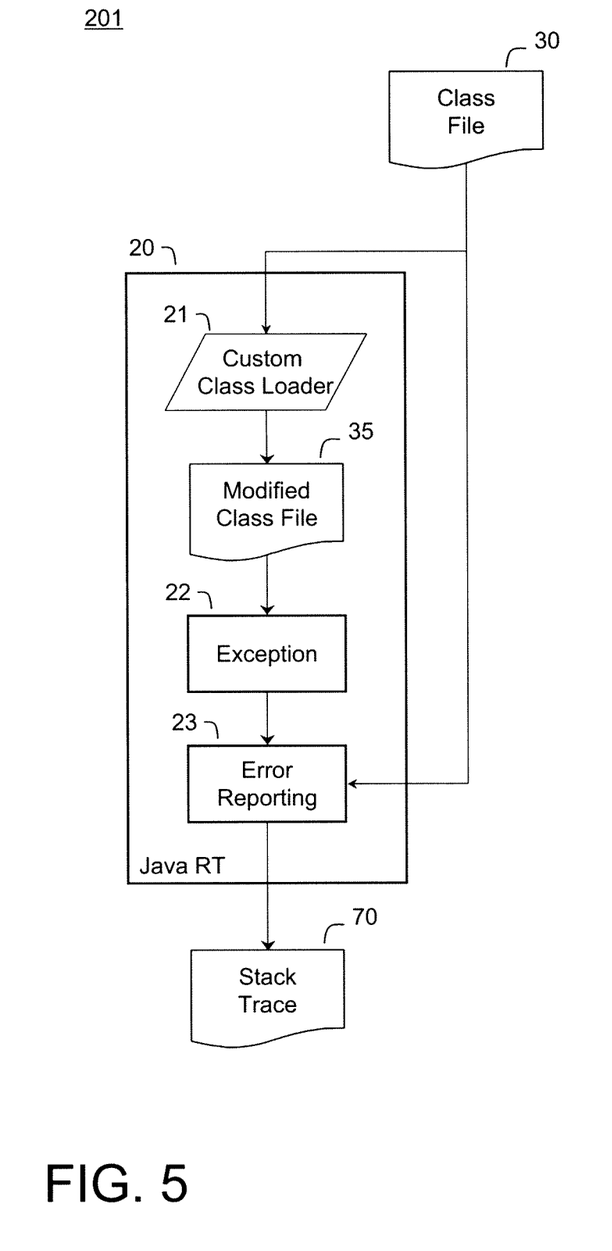
FIG. 5 is a block diagram illustrating an exemplary partitioning and memory optimization process according to a second embodiment of the present invention.
Figure 6:
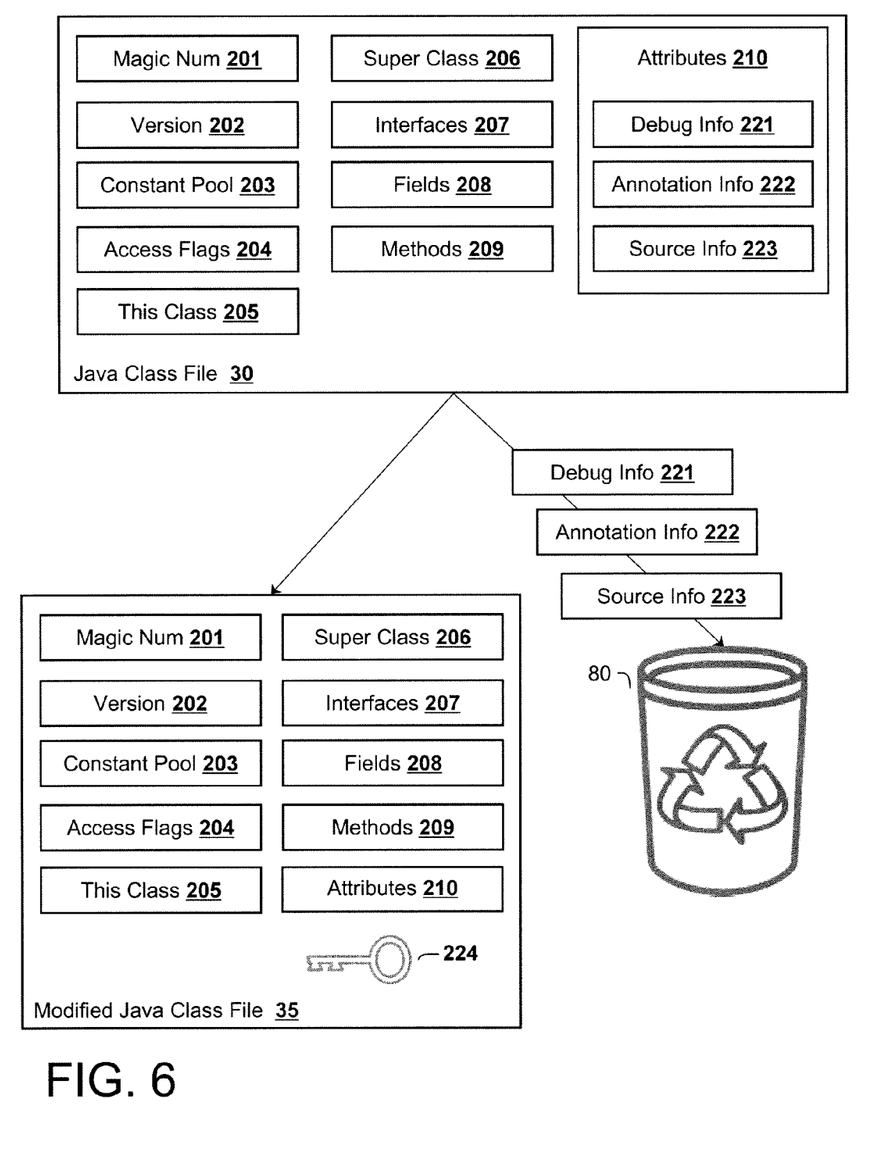
FIG. 6 is a block diagram illustrating the effects of the partitioning process of FIG. 5 on an exemplary Java class file according to a second embodiment of the present invention.
Figure 7A:
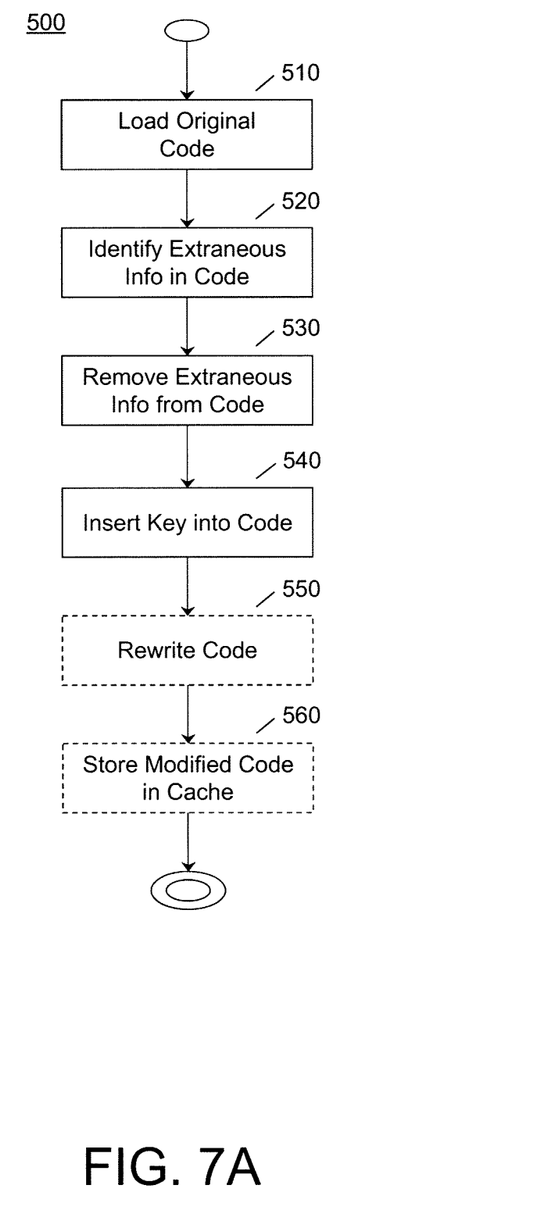
FIGS. 7A and B are flowcharts depicting a partitioning and memory optimization process according to a second embodiment of the present invention.
Figure 7B:
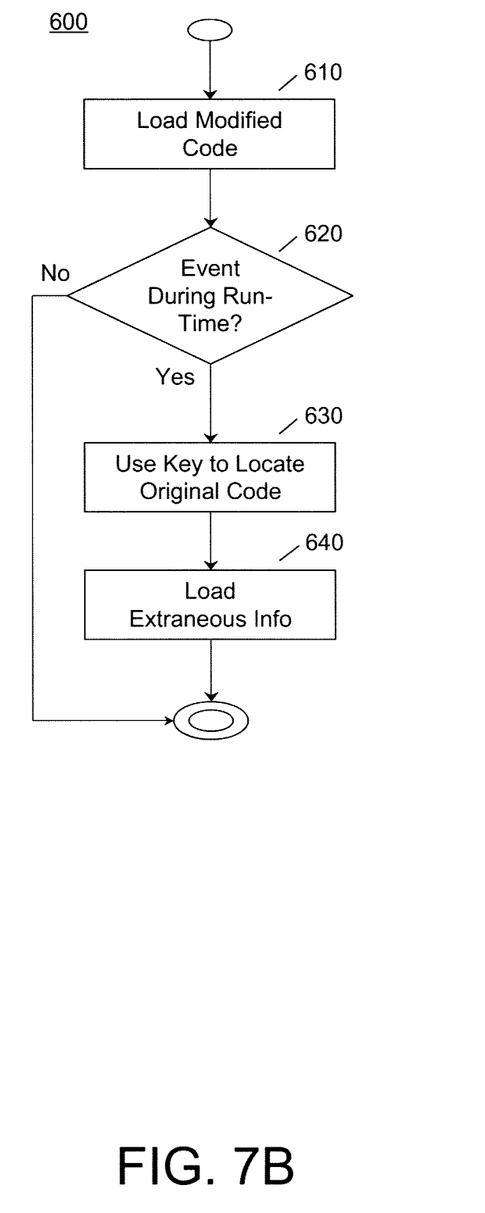

FIGS. 5 through 7 depict various aspects of a second embodiment of the present invention. In this embodiment, code is partitioned by separating extraneous information from the executable code and discarding the extraneous information. If needed, the extraneous information may be loaded from the original code. This approach optimizes memory usage by reducing the memory footprint while maintaining accessibility of the extraneous information for debugging and other processes necessary for servicing code in the field.

FIG. 5 illustrates an exemplary partitioning and memory optimization process that may be performed by the system of FIG. 1 according to a second embodiment of the present invention. In this process, code 30 such as a Java class file or CIL code file is received by a custom class loader 21 in virtual machine 20, where extraneous information in the code 30 is identified. The extraneous information is non-executable information, for example debug information, annotation information, or source information. The code 30 is modified by removing the extraneous information to yield modified code 35, and a unique identification key that identifies the location of the original code 30 is inserted into the modified code 35.

At run-time, the modified code 35 is loaded as normal into the virtual machine 20. If there is a need for the extraneous information during run-time, then the system may locate and load only the appropriate type of extraneous information needed for the particular task. For example, if a fault occurs, the exception handling process 22 and error reporting mechanism 23 request the debug information in order to throw an exception and report the error, but have no need for the annotation information and the source information. The exception handling process 22 and error reporting mechanism 23 use the key to find the storage location in which the original code 30 is stored, and load the debug information from the file so that the stack trace can be populated. Similarly, if the code uses reflection, a reflection process may request the source information, but not the debug information. If the original code was generated or downloaded from a server and does not exist locally, it may be regenerated or downloaded again.

Referring now to FIG. 6, an exemplary Java class file 30 is shown, having ten primary components: magic number 201, version 202, constant pool 203, access flags 204, this class 205, super class 206, interfaces 207, fields 208, methods 209 and attributes 210. The attributes may include debug information 221, annotation information 222 and source information 223. The exemplary Java class file 30 is modified by having its extraneous information, in this case debug information 221, annotation information 222 and source information 223, partitioned from the program instructions and discarded in trash 80 or garbage collected. The extraneous information is replaced by a key 224 in the modified Java class file 35, which identifies the location where the original code 30 is stored or from where it is retrievable, e.g., by download.

Turning now to FIGS. 7A and B, processes 500 and 600 for a partitioning and memory optimization process of a second embodiment are shown generally. Process 500 may be carried out at a time other than run-time or may be carried out by the system at run-time (for example when a class is loaded). Process 600 is generally performed at run-time. In process 500, the system, for example the system of FIG. 1, loads original code in step 510, for example by being loaded by a class loader, and in step 520 identifies extraneous information in the code. In step 530 the system removes the extraneous information from the code, and in step 540 inserts a key into the code to reference the location where the original code comprising the extraneous information is stored or from where it is retrievable. In a system such as an IBM J9 system, this process may be performed by a tool such as the Java Optimizer (JAPT) class manipulation tool, or at run-time it may be performed by the run-time J9 system as part of an extended loading process. When performed by the run-time system, the modified code is the representation of the code that is stored within the virtual machine, and optionally stored within the cache.

In optional step 550, the system rewrites the code so that it indirectly, instead of directly, accesses the extraneous information, for example by modifying one or more of the plurality of program instructions to intercept an exception handling process and redirect it to the stored code using the key. This step is optional, because the process may be performed in other ways, for example by modifying the class library to alter the operation of native functions to transparently load the extraneous information from the stored code, such as Throwable.getStackTrace( ), Class.getDeclaredAnnotations( ) and Class.getGenericInterfaces( ). For example, in the case of a stack trace, the class library may be modified to store the program counter in the StackTraceElement. The program counter is the index into the bytecode instructions at which the method call represented by the StackTraceElement occurs, and is used to find the line number in the line number debug info structure. In optional step 560, the modified code may be stored in cache memory such as the shared class cache, so that subsequent loads of the class may be from the shared class cache to reduce any load time penalty.

As shown in FIG. 7B, during run-time, the system loads the modified code in step 610, and then in step 620 determines if an event requiring extraneous information occurs, for example a fault or a reflection process. If not, this process 600 ends. If yes, the system in step 630 uses the key to locate the desired extraneous information in location where the original code is stored or from where it is retrievable, and loads it in step 640. The memory optimization process then ends, and the system may perform any desired actions with the retrieved extraneous information. The located and loaded extraneous information may be one or more types of extraneous information, for example the debug information, annotation information, and source information previously described. The system may load only the extraneous information desired for a particular purpose, for example, if the system is creating a stack trace, it may locate and load only debug information needed to populate the stack trace, or, if the system uses reflection, it may locate and load only source information needed to perform reflection.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable medium may be, for example, but is not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device. Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

It is to be understood that the software for the computer systems of the present invention embodiments may be implemented in any desired computer language and could be developed by one of ordinary skill in the computer arts based on the functional descriptions contained in the specification and flow charts illustrated in the drawings. By way of example only, the software may be implemented in the C#, C++, Python, Java, or PHP programming languages. Further, any references herein of software performing various functions generally refer to computer systems or processors performing those functions under software control.

The computer systems of the present invention embodiments may alternatively be implemented by any type of hardware and/or other processing circuitry. The various functions of the computer systems may be distributed in any manner among any quantity of software modules or units, processing or computer systems and/or circuitry, where the computer or processing systems may be disposed locally or remotely of each other and communicate via any suitable communications medium (e.g., LAN, WAN, Intranet, Internet, hardwire, modem connection, wireless, etc.).

Aspects of the present invention are described with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks. The computer program instructions may also be loaded onto a computer, other programmable data processing apparatus, or other devices to cause a series of operation steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

A processing system suitable for storing and/or executing program code may be implemented by any conventional or other computer or processing systems preferably equipped with a display or monitor, a base (e.g., including the processor, memories and/or internal or external communications devices (e.g., modem, network cards, etc.) and optional input devices (e.g., a keyboard, mouse or other input device)). The system can include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution. Input/output or I/O devices (including but not limited to keyboards, displays, pointing devices, etc.) can be coupled to the system either directly or through intervening I/O controllers. Network adapters may also be coupled to the system to enable the system to become coupled to other processing systems or remote printers or storage devices through intervening private or public networks. Modems, cable modem and Ethernet cards are just a few of the currently available types of network adapters.

The flowchart and block diagrams in the Figures illustrate the architecture, functionality, and operation of possible implementations of systems, method and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the Figures. For example, two blocks shown in succession may, in fact, be executed substantially concurrently, or the blocks may sometime be executed in the reverse order, depending on the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

What is claimed is:

1. A method for optimizing virtual machine or interpreted code comprising:
   receiving code comprising a plurality of program instructions and first extraneous information, wherein the code is written in a language for execution by a virtual machine and wherein the first extraneous information is a first type of non-executable information;
   modifying the code by removing the first extraneous information and replacing it with a key that references a location of the first extraneous information; and
   executing the modified code and, if an event requesting the first extraneous information occurs during execution, using the key to locate the first extraneous information in the location in response to the event, and loading the first extraneous information from the location.

2. The method of claim 1, wherein the event is a fault and the first type of information is debug information.

3. The method of claim 2, further comprising:
   modifying one or more of the plurality of program instructions to intercept an exception handling process and redirect the exception handling process to the location of the first extraneous information using the key.

4. The method of claim 1, wherein the code comprises second extraneous information, wherein the second extraneous information is a second type of non-executable information, and the first and second types of information are different.

5. The method of claim 4, wherein the second type of information is source information or annotation information.

6. The method of claim 1, wherein the code is a Java class file or a Java Archive (JAR) file, and the plurality of program instructions are Java bytecode instructions.

7. The method of claim 1, wherein the code is a .NET code file, and the plurality of program instructions are Common Intermediate Language (CIL) bytecode instructions.

8. The method of claim 1, wherein the language is an interpreted language.

9. The method of claim 1, wherein the location is a storage location, and further comprising:
   storing the removed first extraneous information in the storage location.

10. The method of claim 1, wherein the location is a storage location where the code is stored, and wherein said loading comprises loading the code from the storage location.

11. The method of claim 1, wherein the location is a location from where the code can be retrieved, and wherein said loading comprises retrieving the code from the location.

12. A computer program product comprising a computer readable storage medium having a computer readable program, wherein the computer readable program when executed on a computer causes the computer to:
   receive code comprising a plurality of program instructions and first extraneous information in a virtual machine environment, wherein the code is written in a language for execution by the virtual machine and wherein the first extraneous information is a first type of non-executable information;

modify the code by removing the first extraneous information and replacing it with a key that references a location of the first extraneous information; and execute the modified code and, if an event requesting the first extraneous information occurs during execution, use the key to locate the first extraneous information in the location in response to the event, and load the first extraneous information from the location.

13. The computer program product of claim 12, wherein the event is a fault and the first type of information is debug information, and wherein the computer readable program when executed on a computer further causes the computer to:
modify one or more of the plurality of program instructions to intercept an exception handling process and redirect the exception handling process to the location of the first extraneous information using the key.

14. The computer program product of claim 12, wherein the location is a storage location and wherein the computer readable program when executed on a computer further causes the computer to:
store the removed first extraneous information in the storage location.

15. The computer program product of claim 12, wherein the location is a location where the code is stored or from where the code is retrievable, and wherein said loading comprises loading the code comprising the first extraneous information from the location.

16. The computer program product of claim 12, wherein the virtual machine is a Common Language Runtime (CLR) virtual machine.

17. The computer program product of claim 12, wherein the virtual machine is a Java Virtual Machine (JVM).

18. The computer program product of claim 17, wherein the language is JavaScript.

19. The computer program product of claim 12, wherein the computer program product is stored on a computer useable optical storage medium.

20. The computer program product of claim 12, wherein the computer program product is stored on a hard disk.

21. A system comprising:
a processor configured with logic to
load code comprising a plurality of program instructions and first extraneous information in a virtual machine environment, wherein the code is written in a language for execution by the virtual machine and wherein the first extraneous information is a first type of non-executable information, modify the code by removing the first extraneous information and replacing it with a key that references a location of the first extraneous information, and execute the modified code and, if an event requesting the first extraneous information occurs during execution, use the key to locate the first extraneous information in the location in response to the event, and load the first extraneous information from the location.

22. The system of claim 21, wherein the event is a fault and the first type of information is debug information, and wherein the processor is further configured with the logic to:
modify one or more of the plurality of program instructions to intercept an exception handling process and redirect the exception handling process to the location of the first extraneous information using the key.

23. The system of claim 21, wherein the location is a storage location and wherein the processor is further configured with the logic to:
store the removed first extraneous information in the storage location.

24. The system of claim 21, wherein the location is a location where the code is stored or from where the code is retrievable, and wherein said loading comprises loading the code comprising the first extraneous information from the location.

25. The system of claim 21, wherein the virtual machine is a Common Language Runtime (CLR) virtual machine or a Java Virtual Machine (JVM).

* * * * *